D. H. BOWLZER.
SLIP JOINT.
APPLICATION FILED SEPT. 19, 1916.
1,295,106.
Patented Feb. 25, 1919.
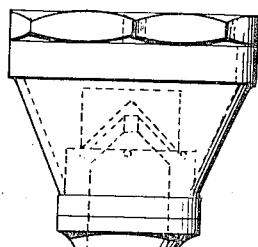
Fig. 1
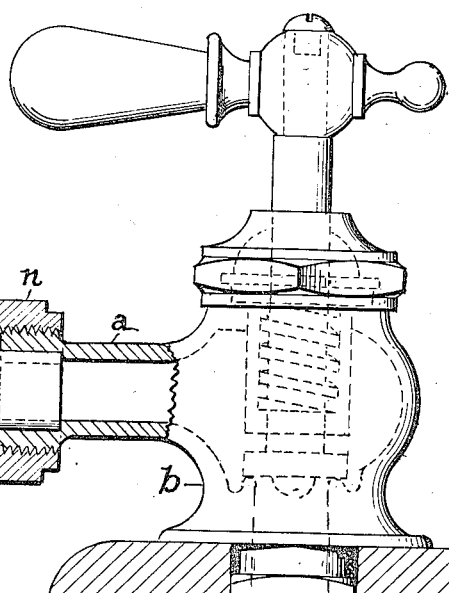
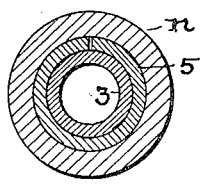
Fig. 2
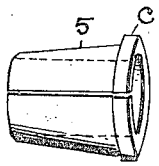
Fig. 3
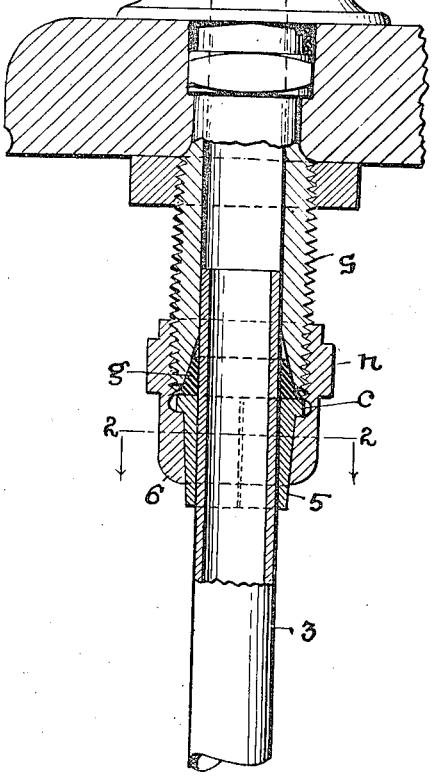
WITNESS
E. M. Fisher
INVENTOR.
DANIEL H. BOWLZER
BY Fisher & Moser
ATTORNEYS.

UNITED STATES PATENT OFFICE.

DANIEL H. BOWLZER, OF CLEVELAND, OHIO, ASSIGNOR TO THE FIRM OF GLAUBER BRASS MANUFACTURING COMPANY, OF CLEVELAND, OHIO, COMPOSED OF MORRIS H. GLAUBER AND THE ESTATE OF JOSEPH H. GLAUBER.

SLIP-JOINT.

1,295,106.  Specification of Letters Patent.  Patented Feb. 25, 1919.

Application filed September 19, 1916. Serial No. 121,058.

*To all whom it may concern:*

Be it known that I, DANIEL H. BOWLZER, a citizen of the United States, residing at Cleveland, in the county of Cuyahoga and State of Ohio, have invented certain new and useful Improvements in Slip-Joints, of which the following is a specification.

This invention consists in an improvement in slip joints, and comprises a split and tapered sleeve adapted to make locking and sealing engagement in a pipe connection, all substantially as shown and described and particularly pointed out in the claim.

In the accompanying drawings, Figure 1 is an elevation partly in section of a water faucet of the fountain type in which the invention has two illustrations, as hereinafter described.

Fig. 2 is a cross section on line 2—2, Fig. 1, and Fig. 3 is a perspective detail of the sleeve, as an article of manufacture and sale.

The illustration of the invention with a faucet as shown in Fig. 1 is in a sense arbitrary and it might as well be shown with any other embodiment wherein a slip joint of this style would be practicable or desirable. However, the present illustration is regarded as apt, particularly in connection with the fountain elbow 2, because of the disposition of persons to tamper with the elbow and to try to turn or rotate it one way or the other or to pull it out, but the sleeve 5 is equally good, and effective where a straight pipe or pipe section is employed as seen, for example, at 3 at the bottom and entrance to the faucet body $b$.

Both said pipes, 2 and 3, are adapted to have a sliding movement within the faucet in which they are engaged, as the pipe 2 in arm $a$ and the pipe 3 in screw stem $s$ on the bottom of body $b$, and the said sleeve 5 will lock and hold the pipe equally well in either case even if it should extend no farther inward than the sleeve itself.

The said sleeve, so-called, is of thimble shape or formation, and has a slot or split lengthwise through the wall thereof so as to be compressible within limits and a bead or collar $c$ about its inner end and an external wedge like taper about its outside to its reduced outer end, and the coupling nut $n$ is correspondingly tapered to narrower size outward in its bore through the outer inclosing portion 6 thereof in which locking of the sleeve 5 is effected by tightening the nut $n$ on the screw thread with which it is engaged.

The said nut has an inner annular depression or groove of a size to accommodate the bead or collar $c$ on said joint, whereby the joint is confined and drawn in tightening relations against the gasket $g$ therein.

By the foregoing construction and arrangement of parts the connecting pipe 2 or 3, or the like, in relation to any embodiment corresponding to the part $b$ is effectually locked against rotation or withdrawal and the joint is made fluid tight. It will be especially noticed that with such a joint the connecting pipe requires no thread or collar to make the union and that the joint is essentially of the slip type with means to lock the pipe firmly in place wherever the conditions under which it is located require it to be placed. In this organization the sleeve 5 is the clamping and locking member, and can be used on any pipe that will fit therein with a coupling nut having a wedging portion adapted to be drawn over said sleeve in a tightening manner up to and against the collar $c$.

What I claim is:

A slip joint construction as described, comprising a pipe, and a coupling member threaded externally having a seat for a gasket at its end within which the pipe is slidably mounted, in combination with a split externally tapered sleeve over said pipe having a collar about its larger and inner end, and a coupling nut tapered to fit upon the taper of said sleeve and having an annular internal seat midway between its ends adapted to receive the collar on said sleeve and to bear against the same, and a gasket engaged by said sleeve collar.

In testimony whereof I affix my signature in presence of two witnesses.

DANIEL H. BOWLZER.

Witnesses:
R. B. MOSER,
A. I. FISCHER.